(12) United States Patent
Jantzi et al.

(10) Patent No.: US 8,666,352 B2
(45) Date of Patent: Mar. 4, 2014

(54) HARMONIC CANCELLATION FOR FREQUENCY CONVERSION HARMONIC CANCELLATION

(76) Inventors: Stephen A. Jantzi, Laguna Beach, CA (US); Amr M. Fahim, Newport Beach, CA (US)

(*) Notice: Subject to any disclaimer, the term of this patent is extended or adjusted under 35 U.S.C. 154(b) by 143 days.

(21) Appl. No.: 13/327,836

(22) Filed: Dec. 16, 2011

(65) Prior Publication Data

US 2013/0157604 A1    Jun. 20, 2013

(51) Int. Cl.
*H04B 1/26* (2006.01)

(52) U.S. Cl.
USPC ............................. 455/323; 455/318

(58) Field of Classification Search
USPC .................. 455/285, 302, 303, 296, 318, 323
See application file for complete search history.

(56) References Cited

U.S. PATENT DOCUMENTS

| | | | | |
|---|---|---|---|---|
| 3,699,461 | A * | 10/1972 | Huntsinger | 327/8 |
| 7,262,815 | B2 | 8/2007 | Su | |
| 8,099,073 | B1 * | 1/2012 | Muller et al. | 455/296 |
| 8,285,240 | B2 * | 10/2012 | Seendripu et al. | 455/317 |
| 2005/0239430 | A1 * | 10/2005 | Shah | 455/326 |
| 2007/0197183 | A1 * | 8/2007 | Sridharan | 455/285 |
| 2009/0104885 | A1 * | 4/2009 | Asayama et al. | 455/296 |

OTHER PUBLICATIONS

Sun, et al, "On-chip active RF tracking filter with 60dB 3rd order harmonic rejection for digital TV tuners", printed from <<http://ieeexplore.ieee.org/search/srchabstract.jsp?openedRefinements=*&arnumber=4815658&filter=AND(NOT(4283010803))&searchField=Search%20All&queryText=on-chip%20active%20rf%20tracking&openedRefinements=*&arnumber=4815658&filter=AND(NOT(4283010803))&searchField=Search%20All&queryText=on-chip%20active%20rf%20tracking>> on Feb. 1, 2010, 2 pages.
Fresco Microchip, Inc:FM2050, "Single-chip DVB-T and universal analog demodulator with IF processing for terrestrial and cable broadcasts", printed from <<http://www.frescomicrochip.com/products_fm2050.html>> on Feb. 24, 2010, 1 page.
Wikipedia, "Heterodyne", printed from <<http://en.wikipedia.org/wiki/Heterodyning>> on Feb. 23, 2010, 5 pages.
Wikipedia, "Image Frequency", printed from <<http://en.wikipedia.org/wiki/Image_frequency>> on Feb. 23, 2010, 1 page.
Wikipedia, "Intermediate Frequency", printed from <<http://en.wikipedia.org/wiki/Intermediate_Frequency>> on Feb. 23, 2010, 3 pages.
Wikipedia, "Superheterodyne Receiver", printed from <<http://en.wikipedia.org/wiki/Superheterodyne_receiver>> on Feb. 23, 2010, 7 pages.
Fresco Microchip, Inc: FM2050, "DVB-T/Analog Demodulator for PC and TV Applications", Preliminary Product Brief, Fresco Microchip, Inc., Jan. 2008, 2 pages.

(Continued)

*Primary Examiner* — Christian Hannon
(74) *Attorney, Agent, or Firm* — Trellis IP Law Group, PC

(57) ABSTRACT

A radio frequency (RF) receiver, such as a television tuner, includes a harmonic cancellation circuit. The harmonic cancellation circuit includes a primary signal path to generate a first intermediate frequency (IF) signal by mixing an RF signal with a reference signal and a harmonic feedforward signal path to generate a second IF signal representing signal content of the RF signal near an nth-order harmonic of a frequency $f_{LO}$ of the first reference signal, n comprising a positive integer. The harmonic cancellation circuit further includes a summation stage to generate a third IF signal based on a difference between the first IF signal and the second IF signal.

22 Claims, 2 Drawing Sheets

(56) References Cited

OTHER PUBLICATIONS

Fresco Microchip, Inc:FM1100 Family, "Fully Integrated Worldwide Legacy Demodulator and Digital IF Processor Solutions for Terrestrial and Cable Broadcasts", Product Brief, Fresco Microchip, Inc., Apr. 2009, 2 pages.

Behbahani, F. et al "CMOS Mixers and Polyphase Filters for Large Image Rejection", IEEE Journal of Solid-State Circuits, vol. 36, No. 6, Jun. 2001, 15 pages.

U.S. Appl. No. 13/323,103, filed Dec. 12, 2011 entitled "Accurate Radio Frequency Filtering Using Active Intermediate Frequency Feedback".

* cited by examiner

HARMONIC CANCELLATION FOR FREQUENCY CONVERSION HARMONIC CANCELLATION

CROSS-REFERENCE TO RELATED APPLICATION

The present application is related to U.S. patent application Ser. No. 13/323,103, entitled "Accurate Radio Frequency Filtering Using Active Intermediate Frequency Feedback" filed on Dec. 12, 2011, the entirety of which is incorporated by reference herein.

FIELD OF THE DISCLOSURE

The present disclosure relates generally to signal processing and more particularly to undesired signal cancellation.

BACKGROUND

Wideband wireless systems are increasingly prevalent in modern communication devices. Applications of wideband wireless systems include high-bandwidth digital communication devices such as 3G and 4G mobile telephony systems, wireless local area network or "Wi-Fi"-enabled systems, and television broadcast systems. The successful operation of such systems often is dependent on accurate radio frequency (RF) filtering.

In a typical wideband wireless system, an antenna is used to receive the entire wireless spectrum, which contains the desired RF signal as well as several undesired blockers. These undesired blockers include adjacent blockers near the frequency of the desired signal and far-out blockers farther away from the frequency of the desired RF signal. High-Q filters are typically tuned to perform bandpass filtering around the desired RF signal. High-Q filters typically are composed of discrete passive devices, such as resistors, capacitors, inductors, and varactors. This configuration mainly serves to attenuate the far-out blockers. The tuning of a high-Q filter typically is performed by means of a feedback signal from a RF tuner component, whereby the accuracy of the filter depends on the accuracy of the feedback signal. Moreover, the sharpness of the filter is a trade-off with the degree to which the desired signal is permitted to droop. The RF tuner component includes a low-noise amplifier (LNA) that amplifies the signal level in such a way that it is sufficiently above the noise floor of the successive blocks of the RF tuner chip. The resulting amplified signal is then fed into a down-conversion mixer that frequency translates the desired RF signal into an intermediate frequency (IF) signal. After down conversion, the IF signal is then further filtered by sharp low frequency filters (at an IF frequency) to attenuate the adjacent blockers.

Although filtering at IF typically can be performed more efficiently than filtering at RF, there are numerous reasons for filtering at RF. For one, RF filtering helps to reduce the total input power to the LNA of the RF tuner component by rejecting far-out blockers, which enhances the effective linearity of the LNA. In many instances, RF surface acoustic wave (SAW) filters or discrete RLC-based filters are used to provide this RF filtering. Such implementations, however, tend to increase overall system costs.

Another reason for RF filtering is image rejection. In a typical RF-to-IF conversion process, a single down-converter mixer down converts the RF spectrum into an IF signal using a local oscillator (LO). The LO typically is a periodic signal having a primary frequency $f_{LO}$ and which typically is generated by an on-chip device, such as a phase-locked loop (PLL). The down-converter mixer produces frequency terms that are the sums and differences between the positive and negative values of the frequencies of signals found in the RF spectrum, including the frequency $f_{CH}$ of the desired RF signal and the frequency $f_{BL}$ of an undesired blocker. The relevant frequency terms are the difference products $f_{CH}$-$f_{LO}$, $f_{LO}$-$f_{CH}$, $f_{BL}$-$f_{LO}$, and $f_{LO}$-$f_{BL}$. Assuming that a low-pass filter (LPF) following the down-converter mixer attenuates the sum terms produced by the down-converter mixer and assuming that the separation in frequency between the desired RF signal and the undesired blocker to the LO are equal to one another, the IF spectrum will be composed of the desired signal overlapping in frequency, or smearing, with the undesired blocker. Accordingly, when an undesired blocker satisfies the condition that the separations in frequency between the desired RF signal and between the undesired blocker and the LO are equal to one another, the undesired blocker is said to lie in the image frequency of the desired signal. Image rejection then becomes the process of inhibiting the RF content at the image frequency or canceling the RF energy at the image frequency when down converting to an IF signal.

One conventional approach for image rejection relies on a dual-conversion architecture, or a heterodyne, architecture. In this architecture, two mixers are utilized. The first mixer converts the RF spectrum into an initial IF spectrum. A high frequency for the initial IF spectrum results in a greater separation between the LO frequency and the RF signal, and thus the image also is further in frequency from the LO frequency. This greater separation thus enables a reasonably low-cost filter to be used to filter out the image. Once the image has been removed, the second mixer is then required to frequency translate the resulting signal into the desired final IF spectrum. Such topologies, however, require two high-performance local oscillators, one for each of the two mixers, and careful frequency planning is needed to avoid undesired overlap of mixing terms between the two mixers. Another conventional approach for image rejection implements a complex image reject mixer that cancels the image through the appropriate phase subtractions using a resistive-capacitive (RC) polyphase filter after the down-conversion mixer. Device mismatch of resistors and capacitors limits the performance of this approach.

Another reason for filtering in the RF domain is to filter out the spectrum near the harmonics of the LO signal. This process is commonly referred to as harmonic reject filtering. The need for harmonic reject filtering is particularly acute when the LO signal is a square waveform, which has strong odd order harmonic terms. When driven by a square wave LO, the down-converter mixer downconverts the RF spectrum near the LO frequency to IF, as well as downconverting the spectrum near the odd-order harmonics of the LO frequency to IF. Accordingly, any blockers near the odd-order harmonics of the LO frequency, and particularly the third-order and fifth-order harmonics, will fold onto the desired signal. This is usually addressed by having sufficient RF filtering before the mixer. This situation can be better understood by considering Equation 1 below, which is a Fourier Series representation of a square wave form:

$$sq(f) = \frac{4}{\pi}\sum_{n=0}^{\infty}\frac{1}{2n+1}\sin(2n+1)2\pi f_0 t \qquad \text{EQ. 1}$$

where t is time (in seconds), $f_0$ is the LO frequency (also in Hz). As Equation 1 illustrates, a square wave can be represented as an infinite sum of sinusoidal signals operating at odd order harmonics of the LO frequency scaled by progressively decreasing coefficients. This demonstrates that blockers near the third-order harmonic (that is, $3*f_{LO}$) and the fifth-order harmonic (that is, $5*f_{LO}$) would be downconverted by the mixer to IF and would add to the desired signal at IF, effectively smearing the desired signal.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
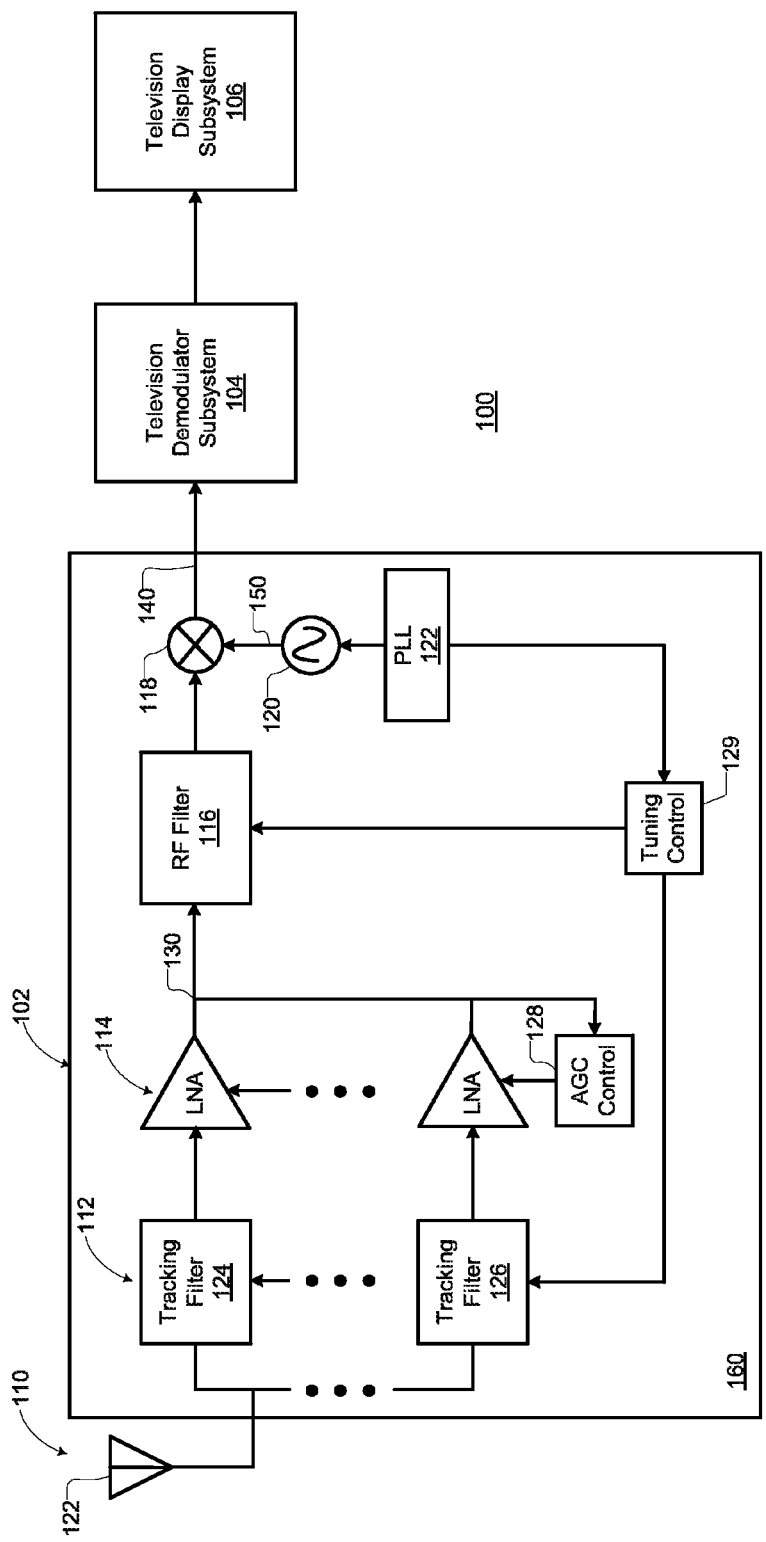
FIG. 1 is a diagram illustrating an example television system implementing improved radio-frequency (RF) filtering techniques in accordance with at least one embodiment of the present disclosure.
Figure 2:
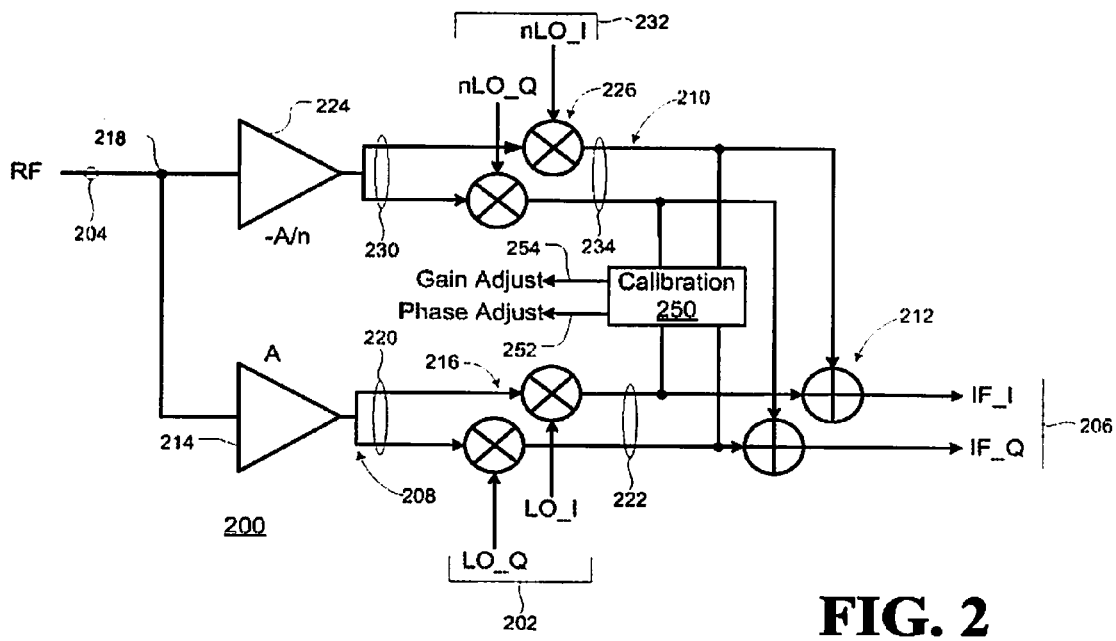
FIG. 2 is a circuit diagram illustrating an example third-order harmonic cancellation filter in accordance with at least one embodiment of the present disclosure.
Figure 3:
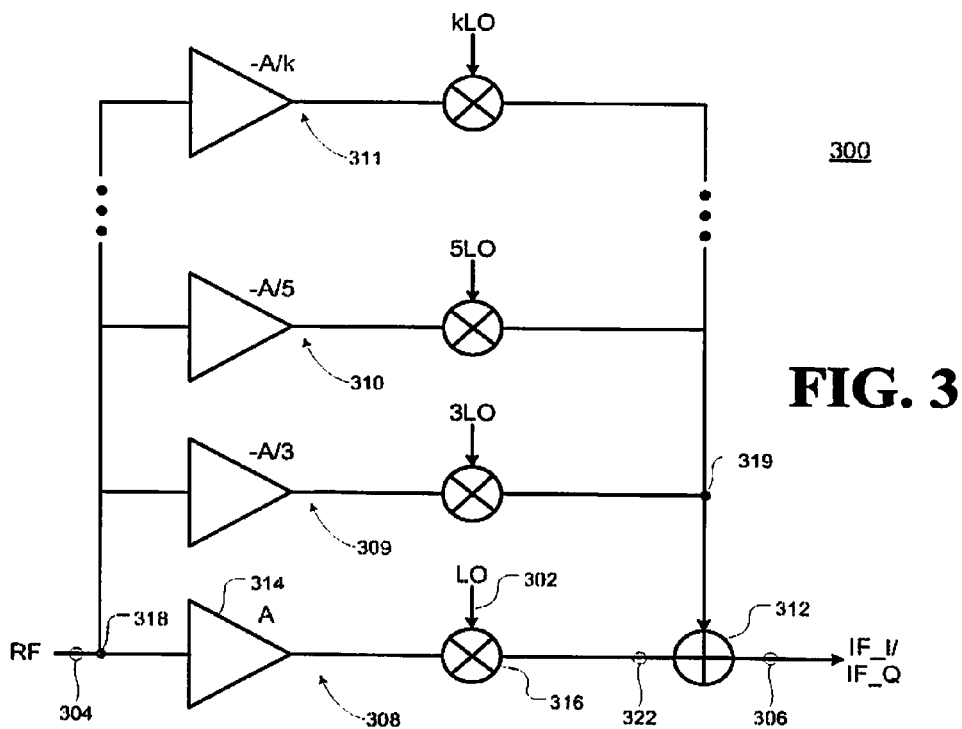
FIG. 3 is a circuit diagram illustrating an example harmonic cancellation filter for multiple odd-order harmonics in accordance with at least one embodiment of the present disclosure.

FIGS. 1-3 illustrate techniques for harmonic rejection for use in radio frequency (RF)-based devices. For ease of illustration, these techniques are described in the context of a RF receiver or tuner of a TV system. However, these techniques are not limited to this context, but may be implemented in any of a variety of RF systems, such as ultra-wideband receivers, software-defined radios, medical imaging transceivers, and the like. Moreover, the techniques described herein are not limited to implementation in receivers, but may also be used for filtering of signals for transmitter systems.

FIG. 1 illustrates an example television system 100 incorporating one or more of the improved RF filtering techniques described herein. The television system 100 includes a television (TV) tuner 102, a TV demodulator subsystem 104, and a TV display subsystem 106. In operation, the TV tuner 102 receives a RF-based signal, tunes to a particular RF band associated with a channel of interest, and down converts the signal within the RF band to a lower-frequency intermediate frequency (IF) signal. The TV demodulator subsystem 104 processes the IF signal to extract the multimedia data embedded in the IF signal. The TV demodulator subsystem 104 then processes the extracted multimedia content for storage, display, subsequent transmission, or a combination thereof. To illustrate, the received RF signal can represent encoded multimedia data, which is obtained by the TV demodulator subsystem 104 by demodulating the IF signal. The TV display subsystem 106 then decodes the encoded multimedia data for display. As another example, the television system 100 can include a digital video recorder (DVR) or set-top box whereby the encoded multimedia data can be either decoded as it is received for a real time display or stored for later decoding and display.

The TV tuner 102, in one embodiment, includes an RF interface 110, a front-end tuned filter unit 112, an amplification unit 114, a RF filter block 116 (e.g., a second tracking filter unit), a complex downconverter 118, and a local oscillator (LO) 120 controlled by a phase-locked loop (PLL) 122. The RF interface 110 can include, for example, an antenna 122 or a coaxial cable interface. The front-end tuned filter unit 112 can include one or more tracking filters (such as tracking filters 124 and 126) to band-pass filter a particular RF band and the amplification unit 114 can include at least one low noise amplifier (LNA) to amplify the tuned RF signal. The tracking filters of the front-end tuned filter unit 112 can be implemented with, for example, high-Q varactors, resistors, capacitors, and inductor elements, and the like. The amplification unit 114 further can include an automatic gain control (AGC) unit 128 to control the gain implemented by an active LNA. In one embodiment, only one tracking unit is active at a time, and the front-end tuned filter unit 112 therefore includes a tuning control unit 129 to activate a particular set of tracking filters and corresponding LNA based on tuning information received from the PLL 122. The tuning information can include, for example, information indicating the selection of a particular television channel, in response to which the tuning control unit 129 activates the tracking filter associated with the RF band that includes the selected television channel. In conventional systems, control of filter center frequencies of tracking filters generally requires a complex tuning control unit and several off-chip components to implement the filter, which increases system cost.

The active tracking filters and active LNA operate to generate an RF signal 130. In at least one embodiment, the RF filter block 116 implements one or more of the RF filtering techniques described herein for harmonic reject filtering or image rejection for the RF signal 130. The downconverter 118 then operates to downconvert the RF signal 130, or a filtered representation thereof, to a corresponding IF signal 140 that is then provided to the television demodulator subsystem 104 for processing as described above. The downconverter 118 mixes the RF signal 130 down to an IF signal 140 by a reference signal 150 provided by the LO 120. To produce an accurate signal, the LO 120 can be controlled by the PLL 122, which determines the LO frequency with high precision.

As noted above, one important reason for filtering at RF is harmonic rejection. In conventional receiver systems, the LO signal to the mixer is usually a square wave form, containing odd-order harmonic components as demonstrated by EQ. 1 above, and in particular, containing strong third-order harmonic components. Thus, the mixing process using a square-wave reference signal can result in signal content from blockers or interferers at unwanted frequencies being introduced into the resulting IF signal 140, including unwanted content from the image frequency and unwanted content from the blockers near odd-order harmonics of the LO frequency. Since the odd-order harmonic frequencies otherwise would be mixed into the desired frequency through the operation of the mixers 118, it generally is difficult, if not impossible, to filter out the image and odd-order harmonics from the IF signal 140 after the downconversion process.

One conventional approach to harmonic rejection is to provide off-chip filtering through the use of external filters. External filters come in the form surface acoustic wave (SAW) filters or high-Q RLC filters. SAW filters have the advantage of having sharp corner frequencies and deep attenuation levels. In many narrow band applications, SAW filters may suffice for third-order harmonic rejection. The main two disadvantages of SAW filters include fixed corner frequencies and difficulty to integrate on-chip (high-cost). In wideband systems, such as TV systems, it is not feasible to use SAW filters since the third harmonic for a low frequency channel will lie on the same frequency as a desired higher channel. For this reason, most TV systems use a tunable RLC filter, which consists of varactors, inductors, capacitors, and resistors. These components are usually off-chip, since it is difficult to realize a high-Q wideband filter on-chip. The RLC network is arranged in such a way as to perform a band-pass filter (BPF) operation with a center frequency around the desired signal. These external components mean increased system cost and tuning the filter becomes complex, which increases the cost of the system further. Another disadvantage of this conventional approach is that it is difficult to realize high-Q filters without causing significant droop of the desired signal.

One method of filtering on-chip is through the use of on-chip $g_m/C$ resonators to realize a band-pass filter (BPF) around the desired channel. Such resonators operate as band-pass filters with center frequencies at:

$$f_0 = \frac{1}{2\pi} \frac{g_m}{C} \qquad \text{EQ. 2}$$

where $g_m$ is the transconductance value of the transconductors used in the resonator, and C is the associated capacitance. This means the frequency tuning can be achieved by control of the value of the transconductor, capacitor, or the combination of the two. The main disadvantage of this method is low-Q at high channel frequencies and high-noise performance of this circuit degrades the overall sensitivity of the TV system.

As an alternative to a $g_m/C$ resonator, a simple RC low-pass filter (LPF) can be used to attenuate the RF signal near the harmonics of the LO signal. Such filters are composed of a passive resistor capacitor network buffered by either an operational amplifier or a transconductance device. Although signal rejection near the harmonics of the LO is possible, the rejection levels are limited. Therefore, an RC LPF can be used to provide only a partial solution to harmonic rejection.

The RF filter block 116 of the TV tuner 102 can provide improved harmonic rejection at reduced cost or complexity compared to conventional harmonic rejection techniques. As an initial stage, the RF filter block 116 can include a low-pass filter (LPF) (not shown) to initially attenuate the energy of the RF signal 130 outside the band of interest, thereby reducing the presence of out-of-band blockers. The LPF can be implemented as, for example, a conventional resistor-capacitor (RC) based low-pass filter (LPF). An RC LPF may not be sufficient to remove potential blockers at the odd-order harmonics from the RF signal. Accordingly, in one embodiment the RF filter block 116 employs one or more tracking harmonic notch filters to provide harmonic cancellation for the RF signal. The tracking harmonic notch filter, in one embodiment, comprises a notch filter having a stop-band, or notch, that is centered at or near the harmonic frequency of the reference signal 150. In one embodiment, multiple instances of the tracking harmonic notch filter are employed to provide additional filtering of the harmonics of the reference signal 150. In one embodiment, the reference signals used by the tracking harmonic notch filters are generated by a local oscillator controlled by a PLL 122.

In one embodiment, the TV tuner 102 is substantially implemented as a single integrated circuit (IC) package. To illustrate, with the exception of the antenna 122 and any external filters or tuning components, the components of the TV tuner 102 can be implemented in, for example, a 48-pin quad flat no-leads (QFN) package. Due to the improved RF filtering provided by the RF filter block 116 as described herein, the IC package can provide a greater degree of decimation of unwanted signal content compared to conventional approaches, thereby facilitating the implementation of less-complex and smaller filtering components. To illustrate, the inventors have found that particular implementations of the RF filtering techniques described herein achieve RF filtering of 30 dB or more, and thus requiring external filtering that provides only 6 dB for an example context whereby a total reduction of at least 36 dB is deemed appropriate.

FIGS. 2 and 3 illustrate example circuits for harmonic rejection of an nth-order harmonic in accordance with at least one embodiment of the present disclosure. As described above, the reference signal 150 used by the mixer 118 typically is implemented as a square wave, which contains content at the odd-order harmonics of the fundamental frequency of the reference signal. Accordingly, any blockers near an odd-order harmonic of the frequency $f_{LO}$ will be folded into the resulting IF signal 140. As illustrated by the circuits of FIGS. 2 and 3, the blockers near the one or more of the odd-order harmonics of the frequency $f_{LO}$ can be reduced in, or eliminated from, the resulting IF signal 140 by downscaling the spectrum of the RF signal near one or more specified harmonics and subtracting the result from the original spectrum, thereby in effect canceling the content at the specified harmonics from the resulting signal.

Distortion and other noise in the reference signal 150 also may contain content at even-order harmonics of the fundamental frequency of the reference signal, and thus blockers near the even-order harmonics also may be folded into the resulting IF signal 140. As such, the circuits of FIGS. 2 and 3 can be adapted to reduce or eliminate blockers near one or more of the even-order harmonics using the techniques described herein. Accordingly, while the techniques of the present disclosure are described primarily in an example context for odd-order harmonic rejection for purposes of illustration, these techniques are not limited to this context, but instead may be implemented for harmonic rejection for one or more even-order harmonics, or for a combination of odd-order harmonics and even-order harmonics.

FIG. 2 illustrates a harmonic cancellation circuit 200 to provide harmonic cancellation of a specified nth-order harmonic of the frequency $f_{LO}$ of a reference signal 202 used to downconvert an RF signal 204 to an IF signal 206. For purposes of illustration, an implementation whereby the RF signal 204 is a real signal having a single component and the IF signal 206 is a complex signal having in-phase (I) and quadrature (Q) components is described.

In the depicted example, the harmonic cancellation circuit 200 includes a primary conversion signal path 208, a harmonic feedforward signal path 210, and a summation stage 212. The primary conversion signal path 208 includes a gain stage 214 and a complex mixer 216. The gain stage 214 comprises an input coupled to a node 218 to receive the RF signal 204 and an output to provide an amplified RF signal 220, whereby the gain stage 214 comprises a transconductor, an amplifier, or other circuit component that amplifies the RF signal 204 by a gain weight A to generate the amplified RF signal 220. The complex mixer 216 has an input coupled to the output of the gain stage 214 to receive the amplified RF signal 220, an input to receive the reference signal 202, and an output to provide a primary IF signal 222 based on the complex mixing of the amplified RF signal 220 and the reference signal 202. In the example of FIG. 2, the reference signal 202 includes an in-phase reference signal LO_I for mixing with the amplified RF signal 220 to generate the in-phase component of the primary IF signal 222, as well as a quadrature reference signal LO_Q for mixing with the amplified RF signal 220 to generate the quadrature component of the primary IF signal 222.

The harmonic feedforward signal path 210 includes a gain stage 224 and a complex mixer 226. The gain stage 224 comprises an input coupled to the node 218 to receive the RF signal 204 and an output to provide a downscaled RF signal 230. As can be determined from Equation 1 above, the third-order harmonic of a square wave has a corresponding Fourier series coefficient of ⅓, or −9.5 decibels (dB), the fifth-order harmonic has a corresponding Fourier series coefficient of ⅕, or −14 dB, and so forth. Accordingly, blockers or interferers in the RF signal are reduced by the Fourier series coefficient corresponding to the nearest harmonic of the frequency $f_{LO}$. That is, a blocker at a frequency near the nth harmonic of the frequency $f_{LO}$ will be reduced to 1/n in at the resulting IF signal. Accordingly, the gain stage 224 comprises an amplifier, transconductor, or other circuit component that downscales and inverts the RF signal 204 using a gain weight that is based on the corresponding Fourier series coefficient to generate the downscaled RF signal 230. To illustrate, the gain weight of the gain stage 224 comprises a negative gain weight that is proportional to the gain weight A of the gain stage 214 of the primary conversion signal path 208 and inversely proportional to n, whereby n is a positive integer representing the nth-order harmonic being canceled by the harmonic cancellation circuit 200. For example, the gain weight of the gain stage 224 can be represented as −A/n, whereby n represents the specified nth-order harmonic of interest. For example, if the removal of blockers at the third-order harmonic are specified, the gain weight of the gain stage 224 would be set to −A/3 (for n=3).

The complex mixer 226 has an input coupled to the output of the gain stage 224 to receive the downscaled RF signal 230, an input to receive a reference signal 232 having a frequency that is the specified harmonic of the reference signal 202 (that is, $n*f_{LO}$), and an output to provide a harmonic feedforward IF signal 234 based on the mixing of the downscaled RF signal 230 and the reference signal 232. In the example of FIG. 2, the reference signal 232 includes an in-phase reference signal nLO_I for mixing with the downscaled RF signal 230 to generate the in-phase component of the harmonic feedforward IF signal 234, as well as a quadrature reference signal nLO_Q for mixing with the downscaled RF signal 230 to generate the quadrature component of the harmonic feedforward IF signal 234.

The summation stage 212 includes an input to receive the primary IF signal 222 from the primary conversion signal path 208, an input to receive the harmonic feedforward IF signal 234 from the harmonic feedforward signal path 210, and an output to provide the sum of the primary IF signal 222 and the harmonic feedforward IF signal 234 as the IF signal 206. In the depicted example, the summation stage 212 separately sums the I components and the Q components of the IF signals 222 and 234 to generate corresponding I and Q components of the IF signal 206. Although the summation stage 212 is depicted in FIG. 2 as a set of adders for ease of illustration, in at least one embodiment the summation of the primary IF signal 222 and the feedforward IF signal 234 is achieved by the direct electrical connection of the I component output of the complex mixer 216 and the I component output of the complex mixer 226 to one output signal path and the direct electrical connection of the Q component output of the complex mixer 216 and the Q component output of the complex mixer 226 to another output signal path.

The operation of the harmonic cancellation circuit 200 serves to substantially reduce or eliminate blockers near the specified harmonic of the frequency $f_{LO}$ during the downconversion of the RF signal 204 to the IF signal 206. The primary conversion signal path 208 serves to downconvert the RF signal 204 using the complex mixer 216 and the reference signal 202 into the primary IF signal 222. In parallel, the harmonic feedforward signal path 210 generates the harmonic feedforward IF signal 234 that is an inverted representation of the signal content in the RF signal 204 near the nth-order harmonic of the frequency $f_{LO}$, with the appropriate downscaling of 1/n to reflect the corresponding reduction in the blockers by the Fourier series coefficient of the nth-order harmonic. As such, the summation of the primary IF signal 222 and the harmonic feedforward IF signal 234 at the summation stage 212 has the result of subtracting the content of the harmonic feedforward signal path 210 from the content of the primary IF signal 222 resulting from the primary conversion signal path 208, thereby suppressing the content at the nth-order harmonic of the frequency $f_{LO}$ in the resulting IF signal 206. As a result, the IF signal 206 represents the difference between the signal content of the primary IF signal 222 and the signal content of the harmonic feedforward IF signal 234.

To illustrate, the Fourier series representing the primary IF signal 222 and the Fourier series representing the harmonic feedforward IF signal 234 for a third-order harmonic cancellation (n=3) can be approximated as:

$$IF_{222} \cong RF \cdot A \cdot \left( \sin(x) + \frac{1}{3}\sin(3x) + \frac{1}{5}\sin(5x) + \ldots + \frac{1}{n}\sin(nx) \right), \quad \text{EQ. 2}$$
$$n \to \infty$$

$$IF_{234} \cong RF \cdot \left( -\frac{A}{3}\sin(3x) - \frac{A}{9}\sin(9x) - \frac{A}{15}\sin(15x) \right) - \ldots \quad \text{EQ. 3}$$

Accordingly, the sum of the primary IF signal 222 and the feedforward IF signal 224 can be approximated as:

$$IF_{206} = IF_{222} + IF_{234} \cong \quad \text{EQ. 4}$$
$$RF \cdot A * \left( \sin(x) + \frac{1}{5}\sin(5x) + \ldots + \frac{1}{n}\sin(nx) \right), n \to \infty$$

noting the cancellation of the term $A*\frac{1}{3}*\sin(3x)$ in the resulting IF signal 206. As an added benefit, RF signal near the odd harmonics of the harmonic reference signal 232 are also canceled, as demonstrated by equation 3. More specifically, the $9^{th}$ and $15^{th}$ harmonics are also canceled.

The accuracy of the harmonic cancellation technique of FIG. 2 depends on the phase matching and amplitude matching between the primary conversion signal path 208 and the harmonic feedforward signal path 210. Accordingly, in one embodiment, the harmonic cancellation circuit 200 further includes a calibration circuit 250 to monitor for the phase relationship and amplitude relationship between the primary IF signal 222 and the harmonic feedforward IF signal 234 and adjust the operation of the harmonic cancellation circuit 200 in response to detecting an amplitude or phase mismatch. Any of a variety of techniques can be used by the calibration circuit 250 to detect phase or amplitude mismatches. To illustrate, because the amplitude of the IF signal 206 should be ideally zero when the RF signal 204 is composed only of a tone at nth harmonic of the LO, the gain of amplifier 224 is adjusted such that the I component of the IF signal 206 is zero. The Q component of the IF signal 206 may still have a signal if the I and Q components of the harmonic reference 232 are not exactly 90 degrees apart. To calibrate for this error, the calibration circuit 250 can calculate the difference between the square of the I component of one of the IF signals 222 or 234 and the square of the Q component of the other IF signal (that is, $I^2-Q^2$). If there is proper phase and amplitude alignment, the filtered result of this difference should converge to zero. In the event that a phase misalignment is detected, the calibration circuit 250 can generate a phase adjust signal 252 to adjust the phase of either the reference signal 202 or the reference signal 232 (or a particular component thereof) to correct for the phase misalignment. In the event that a gain misalignment is detected the calibration circuit 250 can generate a gain adjust signal 254 to adjust the phase of one or both of the gain stage 214 or the gain stage 224 to correct for the gain misalignment.

In certain implementations, it may be sufficient to cancel blockers at only one of the harmonics of the frequency $f_{LO}$. To illustrate, because the content of blockers near the fifth-order harmonic and higher harmonics is reduced by at least −14 dB (or to ⅕), it may be sufficient to provide for cancellation of only the third-order harmonic (that is, n=3). However, in other implementations cancellation of more than one harmonic may be appropriate. Accordingly, FIG. 3 illustrates a harmonic cancellation circuit 300 for canceling multiple harmonics of a reference signal 302 during downconversion of an RF signal 304 to an IF signal 306 in a manner that expands on the principles of the harmonic cancellation circuit 200 of FIG. 2. The harmonic cancellation circuit 300 comprises a primary conversion signal path 308 and a plurality of parallel harmonic feedforward signal paths, such as a third-order harmonic feedforward signal path 309, a fifth-order harmonic feedforward signal path 310, and a kth-order harmonic feedforward signal path 311. The harmonic cancellation circuit 300 further includes a summation stage 312.

As with the primary signal path 208 of FIG. 2, the primary conversion signal path 308 has an input coupled to a node 318 and includes a gain stage 314 with a gain A and a complex mixer 316 receiving the reference signal 302 to generate a primary IF signal 322. Each of the parallel harmonic feedforward signal paths has an input coupled to the node 318, an output coupled to a node 319, a gain stage to downscale the RF signal 304 by a gain weight of −A/n (n=corresponding odd-order harmonic) to generate a corresponding downscaled RF signal, and a complex mixer to receive a reference signal having a frequency of $n^*f_{LO}$ and to output a corresponding feedforward IF signal that serves to remove or cancel blockers from the primary IF signal 322 that are at or near the corresponding harmonic. The summation stage 312 sums the primary IF signal 322 with the plurality of feedforward IF signals to generate the IF signal 306, thereby in effect subtracting the content of any blockers near the odd-order harmonics of the frequency $f_{LO}$ from the primary IF signal 322 before it is provided downstream for further processing. In at least one embodiment the summation of the primary IF signal 322 and the plurality of harmonic feedforward IF signals is achieved by the direct electrical connection of the I component outputs of the complex mixers of the primary signal path and the harmonic feedforward signal paths to one output signal path and the direct electrical connection of the Q component outputs of the complex mixers to another output signal path. As with the harmonic cancellation circuit 200 of FIG. 2, the harmonic cancellation circuit 300 can implement one or more calibration circuits (not shown) to adjust the phase of one or more of the reference signals and to adjust the gains of one or more of the gain stages to improve phase matching and amplitude matching between the primary conversion signal path 308 and the plurality of harmonic feedforward signal paths.

Other embodiments, uses, and advantages of the disclosure will be apparent to those skilled in the art from consideration of the specification and practice of the disclosure disclosed herein. The specification and drawings should be considered exemplary only, and the scope of the disclosure is accordingly intended to be limited only by the following claims and equivalents thereof.

What is claimed is:

1. In a radio frequency (RF) receiver, a method for harmonic rejection comprising:
    generating a first intermediate frequency (IF) signal by mixing an RF signal with a first reference signal;
    generating a second IF signal representing signal content of the RF signal near an nth-order harmonic of a frequency $f_{LO}$ of the first reference signal, n comprising a positive integer greater than 1; and
    generating a third IF signal based on a difference between the first IF signal and the second IF signal.

2. The method of claim 1, wherein generating the second IF signal comprises:
    downscaling the RF signal by a first gain weight that is inversely proportional to n to generate a downscaled RF signal; and
    mixing the downscaled RF signal with a second reference signal having a frequency of $n^*f_{LO}$.

3. The method of claim 2, wherein:
    generating the first IF signal comprises scaling the RF signal by a second gain weight to generate a scaled RF signal and mixing the scaled RF signal with the first reference signal; and
    the first gain weight is proportional to the second gain weight and inversely proportional to n.

4. The method of claim 3, further comprising:
    monitoring an amplitude relationship between the first IF signal and the second IF signal; and
    adjusting at least one of the first gain weight or the second gain weight based on the amplitude relationship.

5. The method of claim 1, further comprising:
    generating a fourth IF signal representing signal content of the RF signal near a kth-order harmonic of the frequency $f_{LO}$ of the first reference signal, k comprising a positive integer greater than n; and
    wherein generating the third IF signal comprises generating the third IF signal further based on a difference between the first IF signal and the fourth IF signal.

6. The method of claim 5, wherein n equals 3 and k equals 5.

7. The method of claim 1, wherein n equals 3.

8. The method of claim 1, further comprising:
    monitoring a phase relationship between the first IF signal and the second IF signal; and
    adjusting a phase of at least one of the first reference signal or the second reference signal based on the phase relationship.

9. A system comprising:
    a harmonic cancellation circuit comprising:
    a primary signal path to generate a first intermediate frequency (IF) signal by mixing an RF signal with a first reference signal;
    a first harmonic feedforward signal path to generate a second IF signal representing signal content of the RF signal near an nth-order harmonic of a frequency $f_{LO}$ of the first reference signal, n comprising a positive integer greater than 1; and
    a summation stage to generate a third IF signal based on a difference between the first IF signal and the second IF signal.

10. The system of claim 9, wherein the first harmonic feedforward signal path comprises:

a first gain stage to downscale the RF signal by a first gain weight that is inversely proportional to n to generate a downscaled RF signal; and a first mixer to mix the downscaled RF signal with a second reference signal having a frequency of $n*f_{LO}$.

11. The system of claim 10, wherein the primary signal path comprises:

a second gain stage to scale the RF signal by a second gain weight to generate a scaled RF signal; and a second mixer to mix the scaled RF signal with the first reference signal;

wherein the first gain weight is proportional to the second gain weight and inversely proportional to n.

12. The system of claim 11, wherein harmonic cancellation circuit further comprises:

a calibration circuit to monitor an amplitude relationship between the first IF signal and the second IF signal and to adjust at least one of the first gain weight or the second gain weight based on the amplitude relationship.

13. The system of claim 9, wherein the harmonic cancellation circuit further comprises:

a second harmonic feedforward signal path to generate a fourth IF signal representing signal content of the RF signal near a kth-order harmonic of the frequency $f_{LO}$ of the first reference signal, k comprising a positive integer greater than n; and wherein the summation stage is to generate the third IF signal further based on a difference between the first IF signal and the fourth IF signal.

14. The system of claim 13, wherein n equals 3 and k equals 5.

15. The system of claim 9, wherein n equals 3.

16. The system of claim 11, further wherein the harmonic cancellation circuit further comprises:

a calibration circuit to monitor a phase and amplitude relationship between the first IF signal and the second IF signal and to adjust a phase of at least one of the first reference signal or the second reference signal based on the phase relationship.

17. The system of claim 9, further comprising:

a RF receiver comprising the harmonic cancellation circuit.

18. The system of claim 17, wherein the RF receiver comprises a television tuner.

19. In a radio frequency (RF) receiver, a method comprising:

mixing an RF signal with a first reference signal having a frequency $f_{LO}$ to generate a primary IF signal; and for each harmonic, other than the first harmonic at the fundamental frequency $f_{LO}$ of a plurality of harmonics of the frequency $f_{LO}$:

generating a corresponding harmonic feedforward signal representative of signal content of the RF signal near the harmonic and downscaled based on a Fourier series coefficient associated with the harmonic; and modifying the primary IF signal based on the harmonic feedforward signal.

20. The method of claim 19, wherein generating a corresponding harmonic feedforward signal comprises:

downscaling the RF signal based on a gain weight that is proportional to a product of the Fourier series coefficient associated with the harmonic and a gain weight of a gain stage used to scale the RF signal for generation of the primary IF signal.

21. The method of claim 20, wherein the plurality of harmonics includes the third-order harmonic.

22. The method of claim 20, wherein modifying the primary IF signal based on the harmonic feedforward signal comprises removing signal content of the harmonic feedforward signal from the primary IF signal.

\* \* \* \* \*